Figure 3:
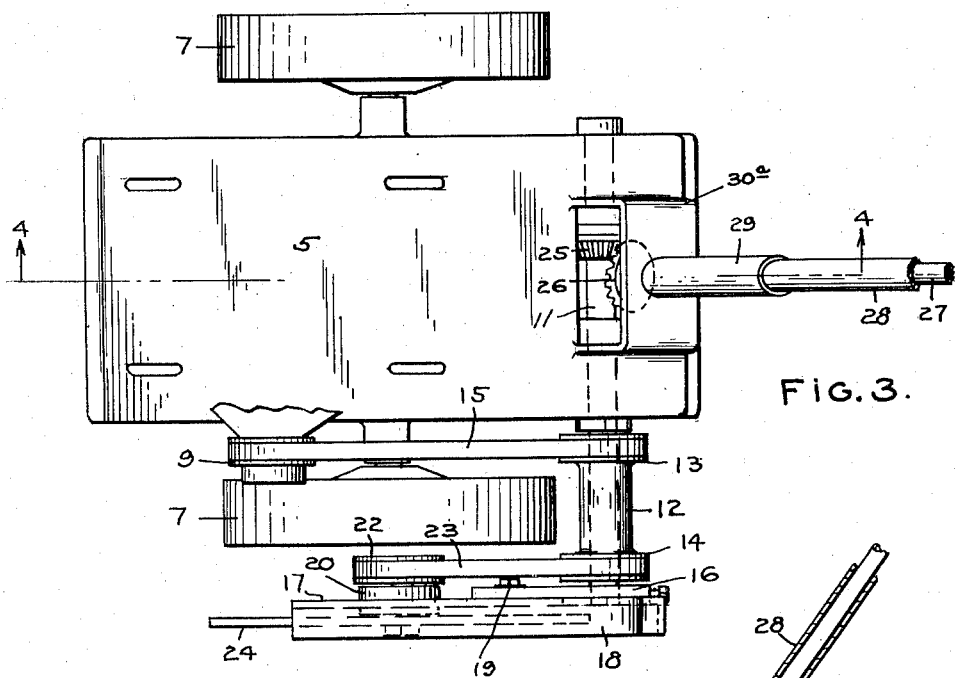

April 8, 1958 D. E. WADSWORTH 2,829,482
LAWN AND GARDEN TRIMMER
Filed May 2, 1956 3 Sheets-Sheet 1
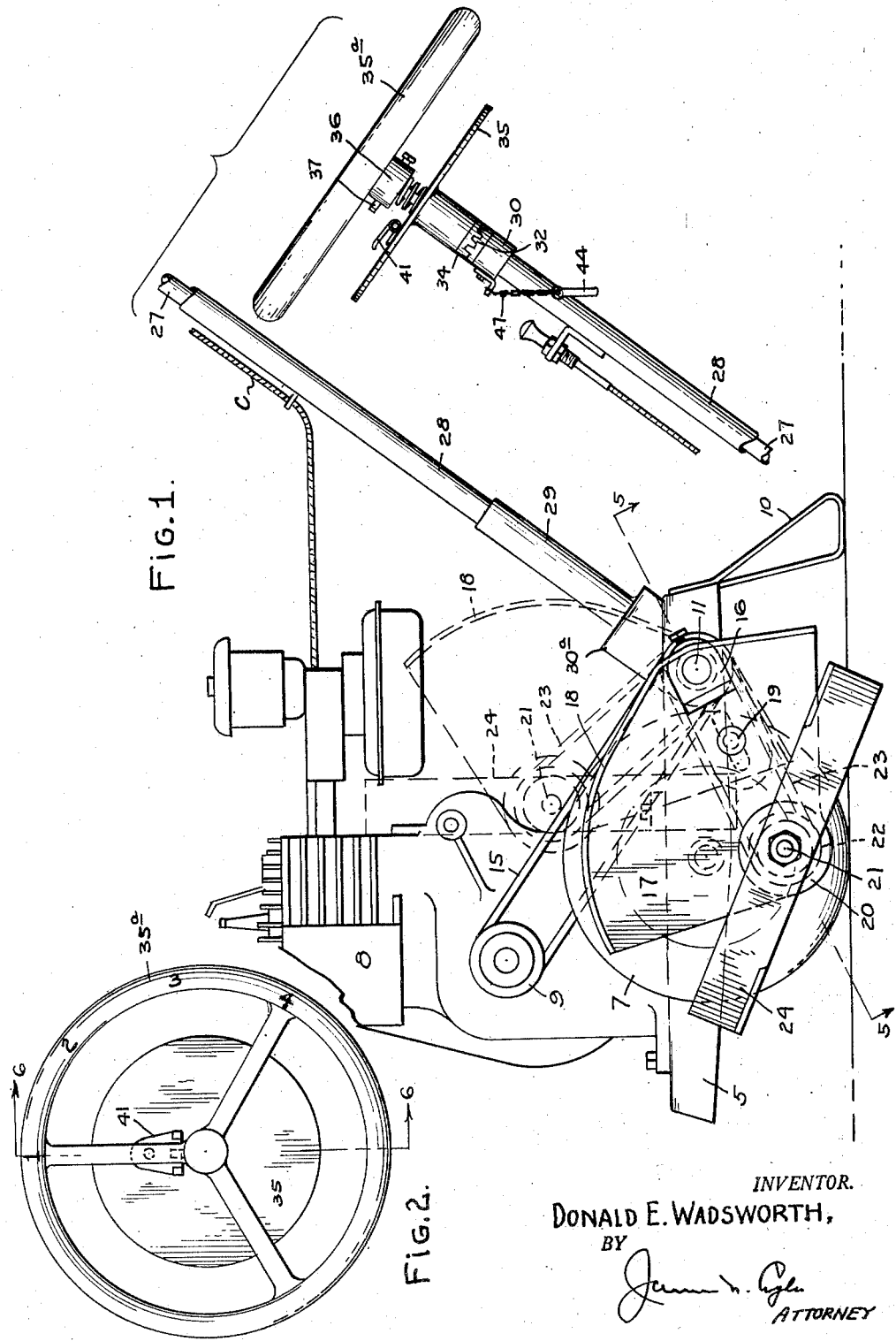
INVENTOR.
DONALD E. WADSWORTH,
BY
ATTORNEY April 8, 1958 D. E. WADSWORTH 2,829,482
LAWN AND GARDEN TRIMMER Filed May 2, 1956 3 Sheets-Sheet 2

INVENTOR.
DONALD E. WADSWORTH,
BY
ATTORNEY.

April 8, 1958 D. E. WADSWORTH 2,829,482
LAWN AND GARDEN TRIMMER
Filed May 2, 1956 3 Sheets-Sheet 3
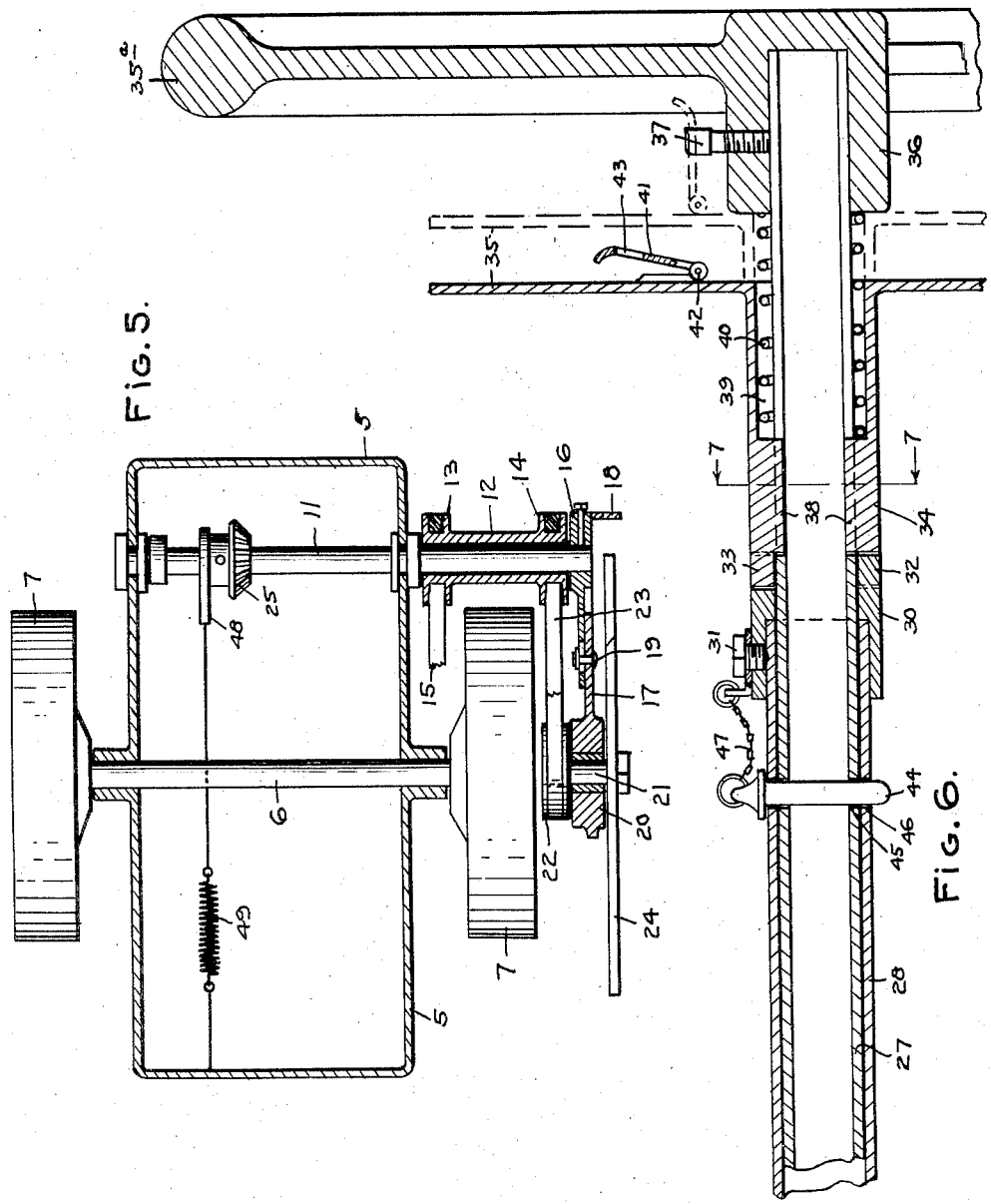
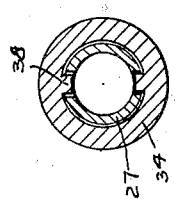
INVENTOR.
DONALD E. WADSWORTH,
BY
ATTORNEY

United States Patent Office 2,829,482
Patented Apr. 8, 1958

2,829,482

LAWN AND GARDEN TRIMMER

Donald E. Wadsworth, Miami, Fla., assignor to
M. K. Wadsworth, North Miami Beach, Fla.

Application May 2, 1956, Serial No. 582,117

3 Claims. (Cl. 56—25.4)

This invention relates to improvements in a lawn and garden trimmer whereby to edge and trim either in a straight line or in circular path.

The invention has for the object to provide a lawn trimmer and edger that includes a platform and a single pair of ground wheels and whereby the trimmer and edger and the prime mover are supported in a substantially balanced manner that permits of the device to be manually propelled by a hand wheel or hand bar in an easy manner without the use of additional weight supporting wheels.

The invention further contemplates a trimmer and edger having a single pair of ground wheels and with a rotary cutting blade disposed outwardly of and closely adjacent to one ground wheel and with the axis of the cutter being closely adjacent to the axis of the wheels and whereby the device may be manually propelled without tendency to pull away from a straight line or cut and with the arrangement of the cutter facilitating the movement of the device in a relatively small circle when trimming or edging around flower beds, trees or the like.

The invention further embodies a novel propelling handle that is provided with a shaft section and a hand wheel and with the shaft section having clutch means whereby beveled gearing is employed to raise and lower the cutting blade in accordance with the depth of cut desired.

The invention further embodies a novel form of control wheel and mechanical linkage whereby to control the elevation of the cutting tool and whereby the cutting tool may be elevated at any time during the operation thereof and with indicator means associated with the hand wheel for indicating the approximate depth of cut being made. The indicator and the clutch is desirable although not essential.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 4:
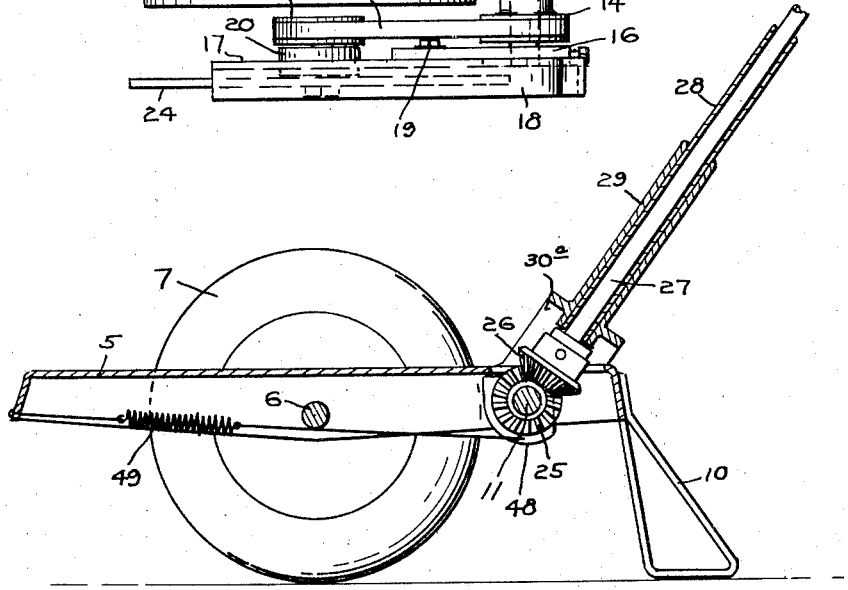

Referring to the drawings:

Figure 1 is a side elevation of a lawn edger and trimmer constructed in accordance with the invention, Figure 2 is a plan view of a control wheel and associated mechanism, Figure 3 is a top plan view of the device with a prime mover broken away and with a control wheel omitted, Figure 4 is a longitudinal section taken substantially on line 4—4 of Figure 3, Figure 5 is a horizontal section taken substantially on line 5—5 of Figure 1, Figure 6 is an enlarged fragmentary section taken substantially on line 6—6 of Figure 2, and Figure 7 is a transverse section taken substantially on line 7—7 of Figure 6.

Referring specifically to the drawings, the numeral 5 designates a generally rectangular platform that constitutes the supporting structure hereinafter described. The platform intermediate its length is provided with an axle 6 that extends entirely thereacross to project upon the opposite sides. The opposite ends of the axle 6 are provided with preferably rubber tired ground wheels 7. The ground wheels support the platform at a predetermined elevation above the lawn or other area to be trimmed or edged. Adjustably supported upon the platform, is a prime mover, here indicated as an internal combustion engine 8, having a drive pulley 9 at one side thereof. It will be observed, that the prime mover for its major length is arranged upon the platform in advance of the axle 6 and whereby to create a definite balanced relation with respect to the mechanism to be hereinafter described. The trailing end of the platform is provided with a ground rest 10, whereby the device may be supported upon the ground without undue tilting of the platform. As clearly shown, the platform is provided with side flanges and these flanges constitute the bearing means for the axle 6. The throttle of the engine may be connected by a flexible cable C to means on the handle of the trimmer for operating the engine.

Extending transversely of the platform and journaled within the side flanges thereof, is a rock-shaft 11. The rock-shaft 11 extends beyond one side flange of the platform to provide a bearing for a rotatable hub 12, the opposite ends of which are provided with grooved pulleys 13 and 14. The pulley 13 is driven from the pulley 9 through the medium of a flexible belt 15. The shaft 11 extends beyond the pulley 14 and has a relatively fixed engagement with a bearing plate 16 that adjustably supports a guard plate 17. The guard plate 17 is segmental in side elevation and is provided with a flange 18. The plate 17 is adjustable with respect to the shaft 11 through the medium of the bearing plate 16 and is clamped in adjustable relationship by a bolt 19. The plate 17 is provided with an enlarged bearing 20 that rotatably supports a stub shaft 21 that projects beyond both faces of the bearing 20. At its inner end the stub shaft 21 is provided with a grooved pulley 22. The pulley 22 is driven from the pulley 14 through the medium of a flexible belt 23. The shaft 21 at its outer end supports a cutting tool 24, here illustrated as being in the form of a flat blade having its opposite ends sharpened in the direction of rotation. It should be here pointed out, that the axial center line of shaft 21 closely approximates the axial center line of the axle 6 and it will also be observed, that the pulleys 14 and 22 are arranged outwardly of the adjacent ground wheel 7 with sufficient clearance as to permit freedom of operation and to permit of an arcuate swinging movement of the plate 17 and its associated bearing 20, shaft 21 and pulley 22 in a manner to be presently described. The flange 18 forms a guard that overlies the field of rotation of the blade 24 and serves to prevent debris being thrown rearwardly into the face of the operator. The belt 15 is adjusted as to tautness by shifting the prime mover 8 toward the leading end of the platform, while the belt 23 is adjusted as to tautness by shifting the plate 17 with respect to the bearing plate 16. The bearing plate 16 is held with respect to the plate 17 against turning movement and any movement imparted to the rock shaft 11 will likewise be imparted to the plate 17 and associated elements. While the cutting tool has been indicated as being a flat blade, it will be apparent that other forms of cutting tools may be engaged with the shaft 21.

Means are provided to vary the depth of cutting action of the tool 24 whereby to easily and conveniently adjust the depth of cut without interrupting the driving action thereof. Such means embodies a beveled gear 25 fixed upon the shaft 11 and this gear 25 is driven by a companion beveled gear 26 carried by an elongated tubular shaft 27. The shaft 27 is such as to dispose a control wheel sufficiently far behind the platform 5 and at a convenient height as to facilitate a walking control of the device. The platform 5 has been cut away beneath the bracket 30a to permit of a free and unobstructed operation of the gear 26. Suitable thrust bearings or washers may be employed between the hub portion of the gear 26 and the inner extended end of the hub 29. The housing 28 at its upper end is provided with a tubular clutch sleeve 30, fixed with respect to the housing 28 by a set screw 31. The sleeve 30 at its upper end is provided with a plurality of clutch teeth 32 for cooperative engagement with clutch teeth 33 carried by a cylindrical clutch sleeve 34. The sleeve 34 is provided with a disk-like head 35, through the medium of which the sleeve 34 may be shifted toward and from the clutch member 30 for engaging and disengaging the teeth 32 and 33. The tubular shaft 27 extends entirely through the clutch member 30 and sleeve 34 and projects therebeyond a predetermined distance where it is connected with a hand wheel 35a. The hand wheel is provided with a central hub 36 that is cylindrically recessed to receive the terminal end of the shaft 27. A set screw 37 serves to fix the hub 36 and the wheel 35a with respect to the shaft 27. The sleeve 34 has a splined connection with the shaft 27 as indicated at 38 and the upper portion of the sleeve 34 is cylindrically recessed as at 39 for the seating reception of a compression coil spring 40 that jointly bears against the bottom of the recesses 39 and the bottom of the hub 36 to thus impart a constant clutched engagement between the member 30 and the sleeve 34. It will therefore be apparent that when the operator engages his fingers beneath the disk 35 and shifts it toward the wheel 35a, the clutch teeth 32 and 33 will be disengaged and the wheel may then be rotated in either a clockwise or anti-clockwise direction, imparting such motion to the shaft 27 for a corresponding movement of the gear 26 for rotating the gear 25 and causing the cutter tool assembly to rise and fall to a predetermined degree and, upon release of the disk 35, the clutch will be reengaged and will positively retain the cutter assembly in the desired degree of elevation. A latch plate 41 is hingedly connected at 42 to the disk 35 and this plate is apertured at 43 for engagement over the head of the screw 37 to thus neutralize the clutch mechanism, as indicated in dotted lines in Figure 6. As shown more clearly in Figure 2, the hand wheel has been provided with indicia indicating four different positions of adjustment and the operator may observe, without inspecting the cutting mechanism such markings and determine the depth of cut being performed. The indicating indicia serves to function only during the use of the clutch mechanism. A further auxiliary safety locking means has been provided in the form of a pin 44 that is adapted to be passed through aligned apertures 45 and 46 of the shaft 27 and the housing 28 thus definitely lock the adjustment mechanism against turning movement. The pin 44 is suspended from the set screw 31 by a flexible element such as a chain 47.

Means are further provided to definitely limit the rocking movement of the shaft 11 from a minimum to a maximum elevation, such means embodying a segmental plate 48 that is fast upon the shaft 11 and is biased in a direction to lift the cutting assembly toward the maximum point of elevation by spring means 49 or the control wheel 35a. Thus, with the stop plate 48, it is not possible to rock the shaft 11 beyond predetermined limits in either direction.

In the use of the device, the prime mover is placed in operation and immediately starts the rotation of the cutter tool 24 through the medium of the pulley 9, the belt 15, the pulleys 13 and 14, the belt 23 and the pulley 22. The operator then proceeds to propel the device along a flower border, sidewalk or the like where the grass is to be trimmmed and, should the cutter be engaged at too great a depth into the ground, the clutch is released and the hand wheel 35 rotated a desired degree to elevate the cutting mechanism through the medium of the rock shaft 11. When it is again desired to cut to a greater depth, the clutch mechanism is again released and the hand wheel 35 rotated in an opposite direction to the predetermined depth, visually indicated by the indicia upon the wheel 35. The several belts are maintained adequately taut through the adjustments heretofore noted. The cutting assembly having its axis substantially in the same plane as the axis of the axle 6, greatly facilitates the movement of the device in a circular path and quickly and easily trims around circular flower borders or the like without any tendency of the machine to travel contrary to a selected line of cut. It has been difficult in machines of similar character to trim around relatively small circles, due to the drag necessary to maintain the machine in a circular path. The device when employed to trim along low lying shrubbery, the cutting assembly is elevated to its maximum height and will quickly and easily trim the side of the hedge to a height determined by the sweep of the cutting tool 24. The position of the prime mover 8 and the cutting assembly has been determined so as to create a substantially balanced device requiring no excessive lifting by the operator to maintain the device free from contact with the ground and the device is just so balanced, that when the hand wheel 35a is released, that it will rock gently back upon the foot 10. While an internal combustion engine has been illustrated as the source of motor power, it will be clearly apparent that the mechanism may be driven by an electric motor of suitable capacity, all other parts remaining as illustrated. It will be clearly apparent that there will never be any necessity to tilt or lift the platform to control the depth of cutting action of the tool, such as has heretofore been necessary in machines of this character having a tandem wheel or possibly only a single ground wheel, thereby greatly facilitating the free and easy operation of the trimmer in operation.

It will be apparent from the foregoing that a relatively simple and most effective trimming and edging device has been provided. The mechanism is quickly and easily adjustable either before or during the operation of the cutting mechanism and permits of the adjustment as to the height of the cutting mechanism without danger to the operator, such as is common with devices of this nature. The parts are few and simple, are strong, durable, cheap to manufacture and most effective for the purposes stated.

It is to be understood that the invention is not limited to the precise structural details illustrated, but that changes are contemplated as readily fall within the spirit of the invention as shall be determined by the scope of the subjoined claims.

Having described my invention, what I claim as new and desire to secure by Letters Patent is:

1. A lawn and garden trimmer comprising an axle having supporting wheels thereon, a platform supported on the axle, an internal combustion engine supported on the platform, a rock-shaft supported on the platform and parallel to the axle, one end of the rock-shaft extending beyond the adjacent wheel on the axle, the extending end having a rotatable hub thereon, said hub having grooved pulleys adjacent each end, said extending end having also a bearing plate fixed thereon, a guard plate adjustably secured on said bearing plate, a bearing secured in said guard plate, a stub shaft carried by said bearing, said stub shaft having a pulley secured on one end and a cutter blade secured on the other end with the guard plate between them, a flexible driving connection between said last named pulley and one of the grooved pulleys on the rock-shaft, a flexible driving connection between the other grooved pulley and the engine, whereby the cutter blade is driven by the engine, means for effecting a slight rotation of the rock-shaft to raise and lower the cutter blade comprising a bevel gear on the rock-shaft, a hollow handle secured on the platform, a hollow shaft extending through the handle and having on one end a bevel gear meshing with the bevel gear on the rock-shaft and a hand wheel on the other end for rotating the shaft to effect raising and lowering of the cutter holding guard plate and the cutter.

2. The invention as defined in claim 1 wherein a clutch mounted on the handle is provided with means for locking the hollow shaft in adjusted position.

3. A lawn and garden trimmer comprising a platform having downwardly depending side flanges, an axle having its ends supported in said flanges, wheels on the axle, an internal combustion engine mounted on the platform, a rock-shaft journaled in the flanges parallel to and rearwardly of the axle, one end of said rock-shaft extending beyond one side flange and the wheel adjacent thereto and having a hub rotatably mounted thereon, said hub having grooved pulleys adjacent each end, the end of the rock-shaft having a bearing plate secured thereon, a guard plate adjustably supported on the bearing plate, a bearing carried by the guard plate, a stub-shaft carried by the bearing, said stub-shaft having a grooved pulley on one end and a cutter blade on the other end, a flexible driving connection between the last-named pulley and one of the grooved pulleys on the rock-shaft, a flexible driving connection between the other grooved pulley of the rock-shaft and the engine whereby the cutter blade is driven by the engine, means for effecting a slight rotation of the rock-shaft to raise and lower the cutter blade comprising a bevel gear on the rock-shaft, a hollow handle having one end secured on the said platform, a hollow shaft having a bevel gear on one end engaging with the bevel gear on the rock-shaft and extending through the hollow handle and having an operating wheel on the other end, and a clutch on the handle operable to lock the hollow shaft and the cutter supporting guard in position when adjusted.

References Cited in the file of this patent

UNITED STATES PATENTS

| | | |
|---|---|---|
| 1,651,759 | Felton | Dec. 6, 1927 |
| 2,281,639 | Swan | May 5, 1942 |
| 2,478,813 | Esleck | Aug. 9, 1949 |
| 2,521,033 | Bell | Sept. 5, 1950 |
| 2,643,503 | Noyes | June 30, 1953 |
| 2,763,116 | Flichbaugh et al. | Sept. 18, 1956 |
| 2,771,730 | True | Nov. 27, 1956 |

FOREIGN PATENTS

| | | |
|---|---|---|
| 744,088 | Great Britain | Feb. 1, 1956 |